(12) United States Patent
Browning et al.

(10) Patent No.: US 10,206,328 B2
(45) Date of Patent: Feb. 19, 2019

(54) SPREADING APPARATUS (71) Applicant: Wessex International Machinery, Andover (GB)

(72) Inventors: Charles Browning, Winchester (GB); Roy Wolfenden, Shrewton (GB)

(73) Assignee: Wessex International Machinery, Andover (GB)

( * ) Notice: Subject to any disclaimer, the term of this patent is extended or adjusted under 35 U.S.C. 154(b) by 382 days.

(21) Appl. No.: 14/903,053

(22) PCT Filed: Jul. 15, 2014

(86) PCT No.: PCT/GB2014/052158
§ 371 (c)(1),
(2) Date: Jan. 5, 2016

(87) PCT Pub. No.: WO2015/008056
PCT Pub. Date: Jan. 22, 2015

(65) Prior Publication Data
US 2016/0150724 A1 Jun. 2, 2016

(30) Foreign Application Priority Data
Jul. 15, 2013 (GB) .................................. 1312619.8

(51) Int. Cl.
*A01C 15/00* (2006.01)
*E01C 19/20* (2006.01)
(Continued)

(52) U.S. Cl.
CPC ............ *A01C 15/007* (2013.01); *A01C 15/18* (2013.01); *A01C 17/001* (2013.01); *A01C 19/02* (2013.01);
(Continued)

(58) Field of Classification Search
CPC ...... A01C 15/007; A01C 15/18; A01C 17/001; A01C 19/02; A01C 21/002; E01C 19/20; E01C 19/203
(Continued)

(56) References Cited

U.S. PATENT DOCUMENTS

| 6,517,281 B1 * | 2/2003 | Rissi ............... E01C 19/203 239/659 |
| 6,935,256 B1 | 8/2005 | Meyer |
| 2003/0168522 A1 | 9/2003 | Kost et al. |

FOREIGN PATENT DOCUMENTS

EP     1219154 A1     7/2002

OTHER PUBLICATIONS

International Preliminary Report on Patentability from International Application No. PCT/GB2014/052158, dated Jan. 28, 2016, 10 pp.
(Continued)

*Primary Examiner* — Steven J Ganey
(74) *Attorney, Agent, or Firm* — Shumaker & Sieffert, P.A.

(57) ABSTRACT

A spreading apparatus (10) for spreading granular and/or pulverulent material such as grain, salt, fertiliser and the like is disclosed. The apparatus (10) includes a hopper (11) having a discharge aperture (12), a vibration unit (17) arranged for agitating material within the hopper (11), circuitry (22) arranged for supplying power from a power source to one or more material handling components of the spreading apparatus (11), monitoring the power drawn by the one or more material handling components and controlling operation of the vibration unit (17) in dependence upon said power. In various embodiments, the material handling components may include one or more of: a spreading disk (15) arranged for distributing material received from the discharge aperture (12); an auger (18) extending through the discharge aperture (12); and/or a conveyer belt arranged for
(Continued)

conveying material from the discharge aperture to the spreading disk (15). A method for spreading granular and/or pulverulent material is also disclosed.

24 Claims, 4 Drawing Sheets

(51) Int. Cl.
    *A01C 15/18*      (2006.01)
    *A01C 17/00*      (2006.01)
    *A01C 19/02*      (2006.01)
    *A01C 21/00*      (2006.01)

(52) U.S. Cl.
    CPC ............ *A01C 21/002* (2013.01); *E01C 19/20* (2013.01); *E01C 19/203* (2013.01)

(58) Field of Classification Search
    USPC .......... 239/1, 7, 663, 668, 675, 681, 659, 69
    See application file for complete search history.

(56) References Cited

OTHER PUBLICATIONS

International Search Report dated Nov. 17, 2014 in corresponding PCT Application Serial No. PCT/GB2014/052158, 5 pgs.
Written Opinion of the International Searching Authority dated Nov. 17, 2014 in corresponding PCT Application Serial No. PCT/GB2014/052158, 7 pgs.

\* cited by examiner

SPREADING APPARATUS

This application is a national stage entry under 35 U.S.C. § 371 of international Application No. PCT/GB2014/052158, field Jul. 15, 2014, which claims priority to G.B Application 1312619.8, filed Jul. 15, 2013. The entire contents of International Application No. PCT/GB2014/052158 and G. B. Application 1312619.8 are incorporated herein by reference.

The present invention relates to automatic control of electric vibration units mounted to spreaders for granular and/or pulverulent material.

Material spreaders are widely used for spreading fertiliser, grain, grit and other granular and and/or pulverulent material. A variety of different material spreaders are available including tractor-drawn spreaders and dedicated spreading vehicles. A typical material spreader includes a hopper having a restricted opening at its base. The granular and and/or pulverulent material is held within the hopper and allowed to pass through the restricted opening thereof. The material that passes through the restricted opening falls on to an external spinning disk, often known as a spinner, which acts to distribute the material across an extended area.

In certain known spreaders, the material passes through the restricted opening of the hopper through the action of gravity alone. One problem with this arrangement is that certain materials do not flow freely, which can lead to blockages in the restricted opening and/or an insufficient flow rate of material.

One improvement to the above-described spreader design is the introduction of one or more vibration units configured to agitate the material within the hopper and hence enhance the flow of material through the restricted opening thereof. Typical vibration units are mounted on the hopper or the surrounding internal framework of the spreader. These vibration units are electrically operated and are manually controlled by means of a simple on/off switch.

One problem with this arrangement is that the vibration unit is either on or off: there is no scope for varying the intensity of vibration applied to the hopper.

Another problem is that it is common practice to turn the vibration unit on upon commencement of spreading and leave the unit running throughout the spreading operation, regardless of whether or not it is actually necessary to assist the flow of material from the hopper to the spinning disk. It is common, for example, for users to inadvertently leave the vibration unit on even when all of the material within the hopper has been discharged.

This continuous operation of vibration units represents an unnecessary energy consumption, which may place an undue strain may be placed on the vehicle battery and charging system.

Furthermore, the continuous operation of vibration units creates renders the units more susceptible to mechanical damage and hence reduces the component life thereof. In particular, the vibration units generate high-frequency vibrations, which can set up resonances in the vibration unit itself and/or in other components of the spreader. These resonances are highly destructive, particularly if the vibration unit is used for long time periods. A number of components of the spreader, such as the vibration units themselves, are expensive and thus any lengthening of the lifespan thereof represents a significant cost saving.

We have now devised an improved spreading apparatus.

In accordance with the present invention, as seen from a first aspect, there is provided a spreading apparatus for spreading granular and/or pulverulent material, the assembly comprising:
  a hopper comprising a discharge aperture;
  agitation means for agitating material within the hopper;
  circuitry arranged for supplying power from a power source to one or more material handling components of the spreading apparatus;
  monitoring means for monitoring the power drawn by the one or more material handling components; and,
  control means for controlling operation of the agitation means in dependence upon said power.

In use, the agitation provided by the agitation means assists flow of material from the hopper through the discharge aperture. The power draw of material handling components provides an indication of the flow rate of material through the discharge aperture of the hopper and hence an indication of whether or not agitation of the material within the hopper is required. The monitoring means is arranged for measuring this power draw and the control means is arranged for controlling the operation of the agitation means accordingly such that the agitation means does not provide unnecessary agitation of the material within the hopper.

The resulting reduction in the total operational time of the agitation means provides a number of advantages.

One advantage of the present invention is that the total power draw from the power source is minimised.

Another advantage of the present invention is that mechanical and/or structural fatigue associated with agitation is reduced and hence component life is extended. This reduction in fatigue may be attributable to both the reduction in total operational time of the agitation means and the intermittent nature over which agitation is provided, the latter acting to minimise the effects of standing waves and resonances that may build up over time.

Furthermore, the agitation means contributes substantially to the noise produced by the spreading apparatus. A reduction in total operational time of the agitation means therefore provides a reduction in the duration of the maximal noise level.

At least one of the one or more material handling components is preferably located within the hopper and more preferably located at least partially within the discharge aperture. Alternatively, or in addition thereto, at least one of the one or more material handling components is preferably located downstream of the hopper. Advantageously, the above-described locations of material handling components provide these components with a high level of sensitivity to the flow rate of material through the discharge aperture.

The control means may be arranged for controlling the intensity of agitation supplied by the agitation means. The control means may be arranged for varying the intensity of agitation supplied by the agitation means in accordance with a variation in the power drawn by at least one of the one or more material handling components.

Alternatively, or in addition thereto, the control means may be arranged for controlling the frequency of agitation supplied by the agitation means.

Alternatively, or in addition thereto, the control means may be arranged for switching the agitation means on or off in accordance with the power drawn by the material handling components. The control means may be arranged for energising the agitation means if the power drawn by at least one of the one or more material handling components is greater than a pre-defined maximum threshold value. Alternatively, or in addition thereto, the control means may be arranged for energising the agitation means if the power drawn by at least one of the one or more material handling components is less than a pre-defined minimum threshold value.

The monitoring means preferably comprises one or more ammeters for measuring amp draw by the one or more material handling components. The control means may be arranged for activating the agitation means if the amp draw of the or each material handing component is greater than a pre-defined maximum threshold value. Alternatively, or in addition thereto, the control means may be arranged for activating the agitation means if the amp draw of the or each material handing component is less than a pre-defined minimum threshold value.

The monitoring means and the control means may be provided by the circuitry such that the circuitry is arranged for monitoring the power drawn by the one or more material handling components and for controlling operation of the agitation means in dependence upon said power.

The power source may comprise a vehicle battery. For the case of tractor-drawn spreaders, the power source may comprise a battery of the tractor to which the spreader is attached. For the case of dedicated spreading vehicles, the power source may comprise a battery of said vehicle.

The agitation means may comprise a vibration unit, which may be mounted on the hopper or proximal to the hopper on a portion of surrounding framework.

The agitation means may comprise a plurality of vibration units, which may be spatially distributed about the hopper. Typical known material spreaders comprise a single vibration unit only; however, the present invention enables sophisticated control of more than one vibration unit. Advantageously, the provision of a plurality of vibration units reduces the spatial localisation of the agitation and hence enhances the efficacy of the spreading apparatus. Furthermore, localised mechanical and/or structural fatigue associated with agitation provided by the vibration units is minimised. The spreading apparatus may be configured to simultaneously operate all of the vibration units. Alternatively, the spreading apparatus may be configured to alternate operation between two or more vibration units.

The spreading apparatus may comprise spreading means arranged to distribute material that exits the hopper via the discharge aperture. The spreading means may comprise a rotary spreading disk. The circuitry may be arranged for supplying power from the power source to the spreading means, the monitoring means may be arranged for monitoring the power drawn by the spreading means and the control means may be arranged for controlling operation of the agitation means at least partially in dependence upon said power. It will be appreciated that an insufficient flow rate of material out of the discharge aperture of the hopper will reduce the amount of work that must be done by the spreading means in order to distribute the material. Accordingly, the control means may be arranged for increasing the intensity of agitation in response to a reduction in power drawn by the spreading means. It will further be appreciated that once all of the material has passed out of the hopper the load on the spreading disk will be substantially zero and hence the power drawn by the spreading means will be minimal. The control means may therefore be arranged for de-energising the agitation means if the power drawn by the spreading means is less than a pre-defined minimum threshold value. Alternatively, the control means may be arranged for energising the agitation means if the power drawn by the spreading means is less than a pre-defined minimum threshold value, this case being appropriate if the substantially zero load on the spreading means is attributable to a blockage in the discharge aperture. It is envisaged that the monitoring means will be arranged for monitoring the power drawn by one or more additional material handling components. The control means may then distinguish between the alternative situations of an exhaustion of material within the hopper and a blockage in the discharge aperture according to said power supplied said to one or more additional material handling components.

The spreading apparatus may comprise internal conveying means for supplying material from an interior of the hopper to the spreading means. The internal conveying means may comprise an auger, which preferably extends through the discharge aperture of the hopper. The circuitry may be arranged for supplying power from the power source to the internal conveying means, the monitoring means may be arranged for monitoring the power drawn by the internal conveying means and the control means may be arranged for controlling operation of the agitation means at least partially in dependence upon said power. It will be appreciated that the internal conveying means acts in conjunction with the agitation means to assist flow of material from the hopper through the discharge aperture. A high power draw from the internal conveying means therefore provides an indication that an increase in agitation may be required. Accordingly, the control means may be arranged for increasing the intensity of agitation in response to an increase in power drawn by the internal conveying means. It will further be appreciated that once all of the material has passed out of the hopper the load on the internal conveying means will be substantially zero and hence the power drawn by the internal conveying means will be minimal. The control means may therefore be arranged for de-energising the agitation means if the power drawn by the internal conveying means is less than a pre-defined minimum threshold value.

The spreading apparatus may comprise external conveying means arranged for conveying material from the discharge aperture to the spreading means. The external conveying means may comprise an endless conveyer belt. The circuitry may be arranged for supplying power from the power source to the external conveying means, the monitoring means may be arranged for monitoring the power drawn by the external conveying means and the control means may be arranged for controlling operation of the agitation means at least partially in dependence upon said power. It will be appreciated that an insufficient flow rate of material out of the discharge aperture of the hopper will reduce the load carried by the external conveying means and hence reduce the amount of power required by the external conveying means. The control means may therefore be arranged for increasing the intensity of agitation in response to a reduction in power drawn by the external conveying means. It will further be appreciated that once all of the material has passed out of the hopper the load on the external conveying means will be substantially zero and hence the power drawn by the external conveying means will be minimal. The control means may therefore be arranged for de-energising the agitation means if the power drawn by the external conveying means is less than a pre-defined minimum threshold value. Alternatively, the control means may be arranged for energising the agitation means if the power drawn by the external conveying means is less than a pre-defined minimum threshold value, this case being appropriate if the substantially zero load on the external conveying means is attributable to a blockage in the discharge aperture. It is envisaged that the monitoring means will be arranged for monitoring the power drawn by one or more additional material handling components. The control means may then distinguish between the two alternative situations of an exhaustion of material within the hopper and a blockage in the discharge aperture according to said power supplied said to one or more additional material handling components.

In accordance with the present invention, as seen from a second aspect, there is provided a method for spreading granular and/or pulverulent material, the method comprising the steps of:

monitoring power consumed by one or more material handling components of a spreading apparatus; and, controlling agitation of the granular and/or pulverulent material contained within a hopper of the spreading apparatus in dependence upon said power.

The step of monitoring power consumed by one or more material handling components may comprise measuring amp draw by the respective one or more material handling components.

The step of controlling agitation of the material within the hopper may comprise controlling operation of agitation means arranged for agitating the granular and/or pulverulent material contained within the hopper. The agitation means may comprise one or more vibration units. The agitation means may comprise a plurality of vibration units. Preferably the step of controlling operation of the agitation means comprises individually controlling each of the plurality of vibration units such that the vibration units may operate simultaneously and/or sequentially.

The step of controlling agitation may comprise for controlling the intensity of agitation.

Alternatively, or in addition thereto, the step of controlling agitation may comprise controlling the frequency of agitation.

Alternatively, or in addition thereto, the step of controlling agitation may comprise switching the agitation means on or off in accordance with the power consumed by at least one of the one or more material handling components. The step of controlling agitation may comprise energising the agitation means if the power consumed by at least one of the one or more material handling components is greater than a pre-defined maximum threshold value. Alternatively, or in addition thereto, the step of controlling agitation may comprise energising the agitation means if the power consumed by at least one of the one or more material handling components is less than a pre-defined minimum threshold value.

The step of monitoring power drawn by one or more material handling components of a spreading apparatus may comprise monitoring power consumed by spreading means of the spreading apparatus. In this embodiment, the step of controlling agitation may comprise controlling operation of the agitation means at least partially in dependence upon the power consumed by the spreading means. The step of controlling agitation may comprise energising or de-energising the agitation means if the power consumed by the spreading means is lower than a pre-defined minimum threshold value. The step of controlling agitation may comprise increasing the intensity of agitation in response to a reduction in power consumed by the spreading means and decreasing the intensity of agitation in response to an increase in power consumed by the spreading means.

Alternatively, or in addition thereto, the step of monitoring power consumed by one or more material handling components of a spreading apparatus may comprise monitoring power consumed by internal conveying means of the spreading apparatus. In this embodiment, the step of controlling agitation may comprise controlling operation of the agitation means at least partially in dependence upon the power consumed by the internal conveying means. The step of controlling agitation may comprise energising the agitation means if the power consumed by the internal conveying means is greater than a pre-defined maximum threshold value. The step of controlling agitation may comprise increasing the intensity of agitation in response to an increase in power consumed by the internal conveying means and decreasing the intensity of agitation in response to a reduction in power consumed by the internal conveying means.

Alternatively, or in addition thereto, the step of monitoring power consumed by one or more material handling components of a spreading apparatus may comprise monitoring power consumed by external conveying means of the spreading apparatus. In this embodiment, the step of controlling agitation may comprise controlling operation of the agitation means at least partially in dependence upon the power consumed by the external conveying means. The step of controlling agitation may comprise energising or de-energising the agitation means if the power consumed by the external conveying means is lower than a pre-defined minimum threshold value. The step of controlling agitation may comprise increasing the intensity of agitation in response to a reduction in power consumed by the external conveying means and decreasing the intensity of agitation in response to an increase in power consumed by the external conveying means.

If the method comprises monitoring power consumed by more than one material handling component, the step of controlling agitation may comprise energising or de-energising the agitation means if the power consumed by at least one of the monitored material handling components is outside a respective pre-defined range. The step of controlling agitation may comprise energising or de-energising the agitation means if the power consumed by at least two of the monitored material handling components is outside respective pre-defined ranges. The step of controlling agitation may comprise varying the intensity of agitation in response to a variation in the power consumed by at least one of the respective monitored material handling components. The step of controlling agitation may comprise varying the intensity of agitation in response to a variation in the power consumed by each of the respective monitored material handling components.

An embodiment of the present invention will now be described by way of example only and with reference to the accompanying drawings, in which.

Figure 1A:
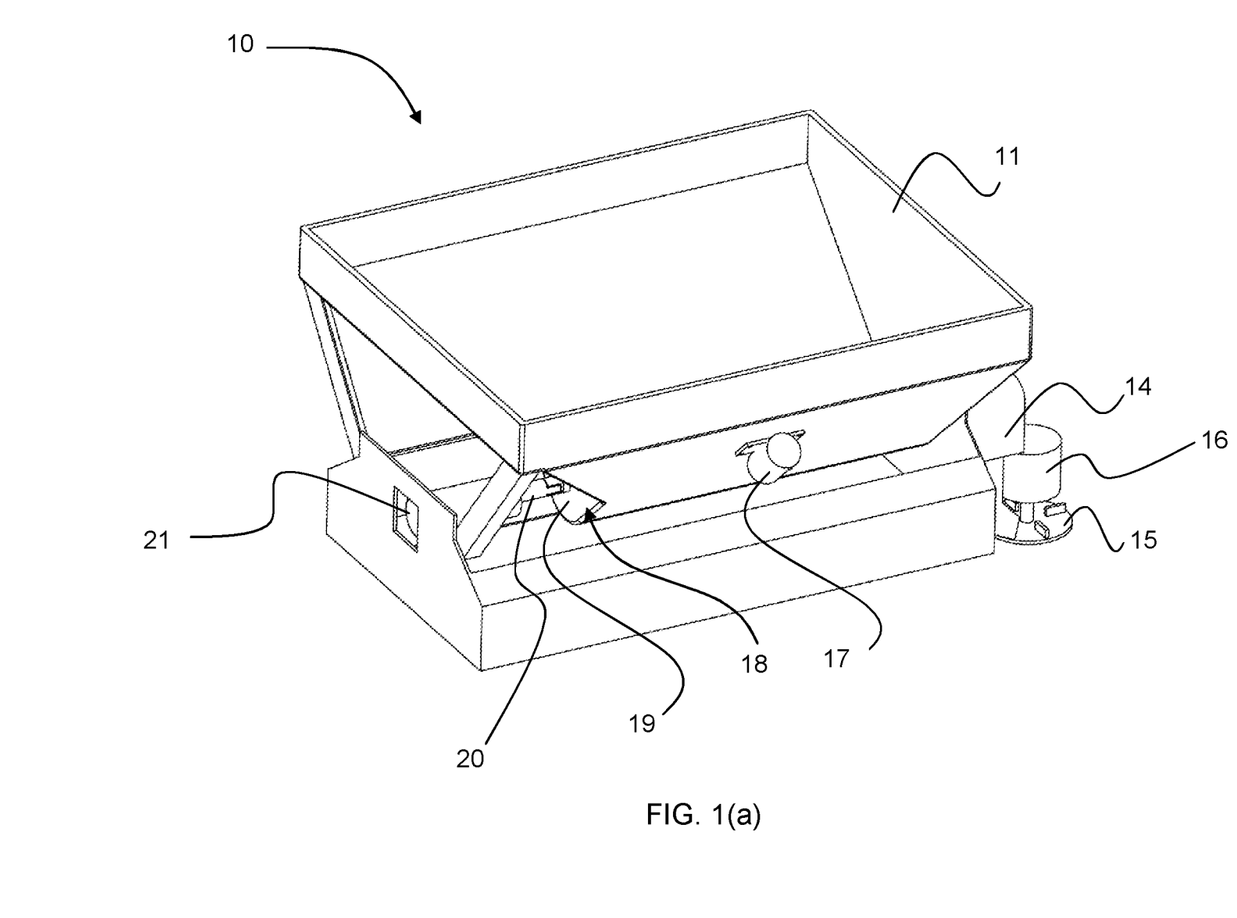
FIG. 1(a) shows a perspective view of a spreading apparatus in accordance with an embodiment of the present invention.
Figure 1B:
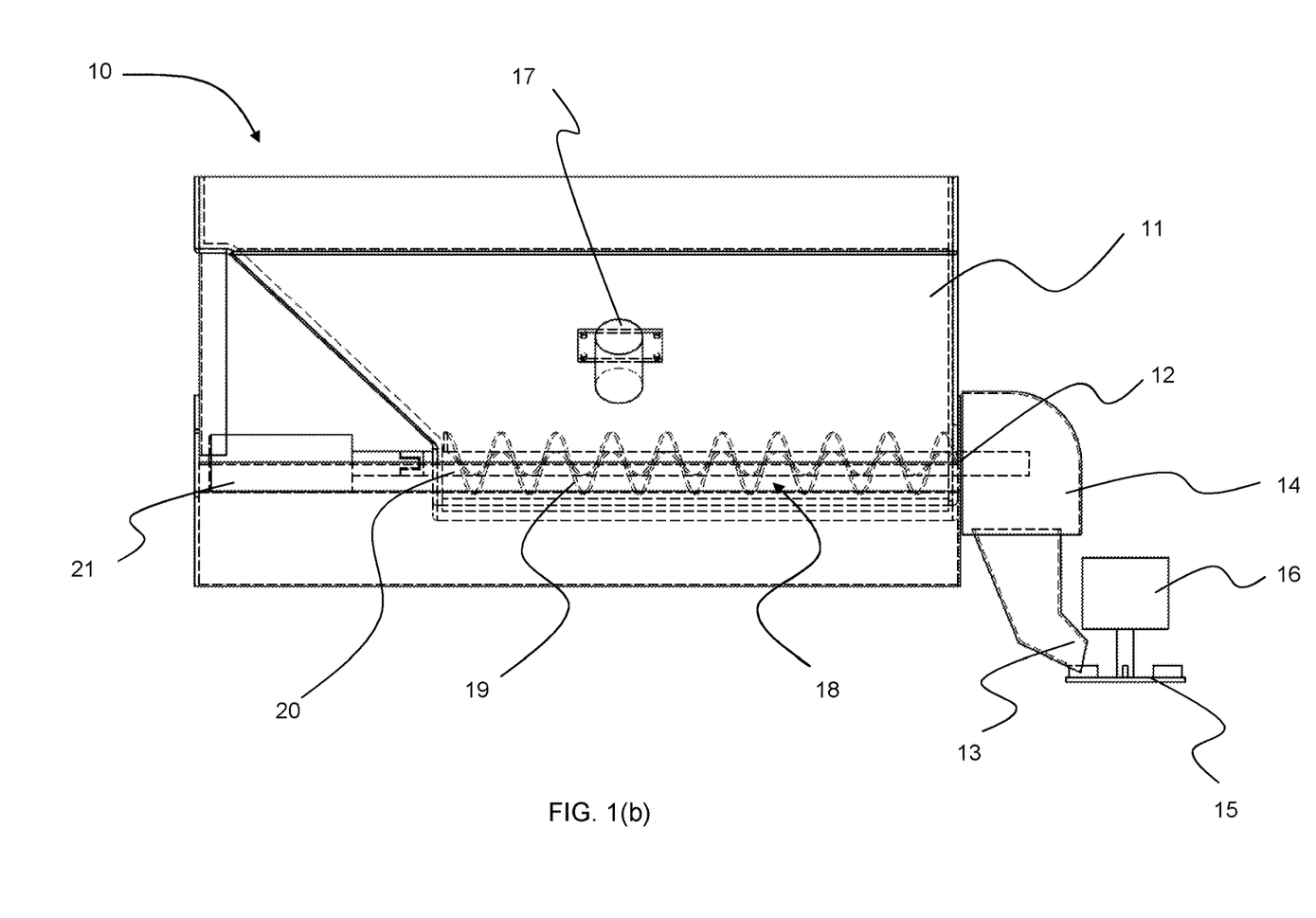
FIG. 1(b) shows a side view of the spreading apparatus illustrated in FIG. 1(a), the external components being shown in solid and the internal components being shown in dash.

With reference to FIGS. 1(a) and 1(b) of the drawings, there is illustrated a spreading assembly 10 in accordance with an embodiment of the present invention. It is envisaged that the spreading assembly 10 will be coupled or coupleable to a motor vehicle (not shown). The spreading assembly 10 may take the form of a detachable trailer or may be formed integrally with the motor vehicle.

The spreading assembly 10 includes a hopper 11 comprising a discharge aperture 12 at a lower end of a side wall thereof. The discharge aperture 12 is connected to a downwardly depending spout 13 via a right-angled elbow portion 14.

Spreading means in the form of a spreading disk 15 is provided below the lower end of the spout 13 such that material that exits the hopper 11 through the discharge aperture 12 thereof falls under gravity on to an upper face the spreading disk 15. The spreading disk 15 arranged for rotary motion about a substantially vertical axis, this rotary motion being driven by a motor 16.

The spreading assembly 10 further includes one or more vibration units 17 arranged for agitating material within the hopper 11. FIGS. 1(a) and 1(b) illustrate a vibration unit 17 secured to an outer face of a side wall of the hopper 11. It is envisaged that a second vibration unit (not shown) will be secured to an outer face of an opposing side wall of the hopper 11. In alternative embodiments (not shown), the spreading assembly may comprise more than two vibration units or may comprise a single vibration unit. It is envisaged that the vibration units 17 are operable at different vibration frequencies and/or different vibration amplitudes. However, vibration units 17 having a single frequency and single amplitude of operation are not outside of the scope of the present invention.

Internal conveying means in the form of an auger 18 is provided within the hopper 11. The auger 18 extends along the base of the hopper 11 and through the discharge aperture 12. The auger 18 comprises a helical screw blade 19 coiled around an elongate shaft 20. A motor 21 is provided at an end of the shaft 20 distal to the discharge aperture 12, the motor 21 being arranged for rotating the shaft 20 and hence encouraging the egress of material from the hopper 11 through the discharge aperture 12.

Figure 2:
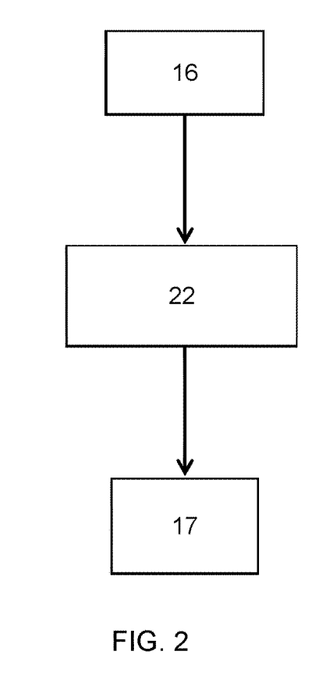
FIG. 2 shows a schematic illustration of a control system suitable for use with the spreading apparatus illustrated in FIG. 1.
Figure 3:
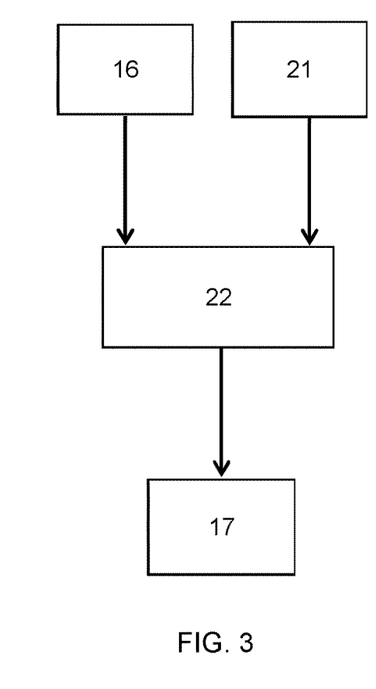
FIG. 3 shows a schematic illustration of an alternative control system suitable for use with the spreading apparatus illustrated in FIG. 1; and, FIG. 4 shows a flow diagram of a method for spreading granular and/or pulverulent material in accordance with an embodiment of the present invention.

Circuitry 22, shown schematically in FIGS. 2 and 3, is arranged for supplying power from an electrical power source (not shown) to the spreading disk motor 16, the auger motor 21 and the vibration units 17. It is envisaged that the electrical power source will comprise a vehicle battery configured to power a starter motor of the spreading apparatus 10 or a starter motor of a motor vehicle (not shown) to which the spreading apparatus 10 is coupled.

The circuitry 22 is arranged for monitoring the power drawn by the spreading disk motor 16 and/or the auger motor 21 and controlling operation of the vibration units 17 in dependence upon the power drawn by the spreading disk motor 16 and/or the auger motor 21.

The above-described functionality may be achieved through the use of conventional components such as ammeters, variable resistors, logic gates and the like. In one embodiment, the circuitry 22 comprises an electronic switch (not shown) arranged for selectively interrupting power supply from the power source to the vibration units 17. If the apparatus 10 comprises more than one vibration unit 17, a separate electronic switch may be provided for each vibration unit 17 or one electronic switch may be configured for selectively interrupting power supply to all of the vibration units 17 within the spreading apparatus 10.

Alternatively, or in addition thereto, a processor (not shown) may be provided, the processor being arranged to receive inputs from a monitoring device arranged for monitoring the power drawn by the spreading disk motor 16 and/or the auger motor 21 and further arranged to control the of the vibration units 17 in dependence upon said power.

In the embodiment illustrated in FIG. 2, the circuitry 22 is arranged for monitoring the power drawn by a single material handling component: the spreading disk motor 16. The circuitry 22 may comprise an ammeter (not shown) arranged for measuring the amp draw of the spreading disk motor 16. The circuitry 22 is further arranged for controlling operation of the vibration units 17 in dependence upon the amp draw of the spreading disk motor 16. The vibration units 17 are optionally operable at different vibration amplitudes and the circuitry 22 is optionally arranged for varying the amplitude of vibration in dependence upon the amp draw of the spreading disk motor 16.

Figure 4:
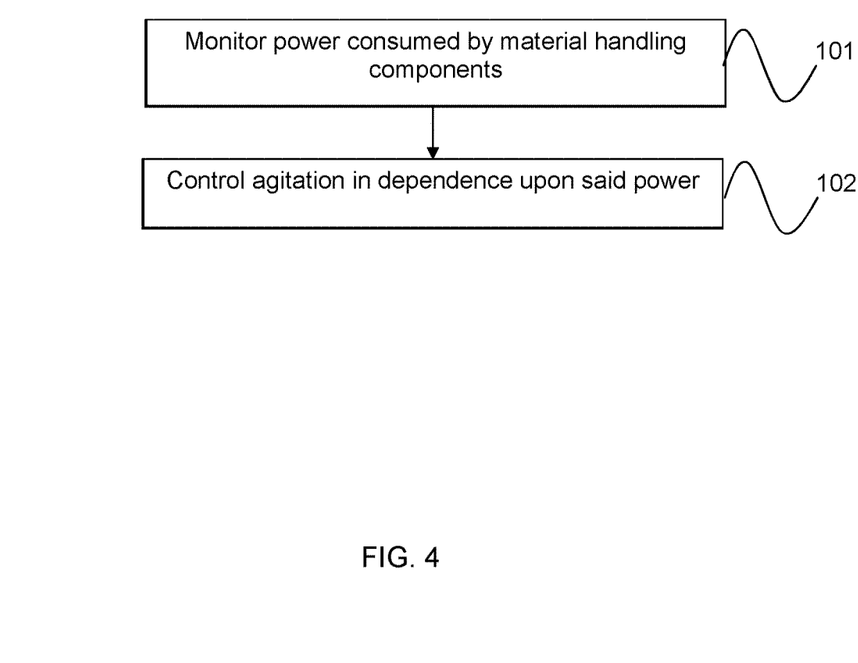

With particular reference to FIGS. 1, 2 and 4 of the drawings, in use, the circuitry 22 measures the amp draw of the spreading disk motor 16 at step 101. If the hopper 11 contains sufficient material and the material is flowing freely out of the discharge aperture 12 thereof, there is a high flow rate of material onto the spreading disk 15 and thus the spreading disk motor 16 consumes a large amount of power in order to rotate at the desired speed. Accordingly, a high amp draw is measured by the circuitry 22 at step 101. If, however, all of the material within the hopper 11 has been exhausted, the flow rate of material onto the spreading disk 15 is substantially reduced and hence the power consumed by the spreading disk motor 16 is correspondingly reduced. Accordingly, a low amp draw is measured by the circuitry 22 at step 101.

At step 102, the circuitry 22 controls the operation of the vibration units 17 in accordance with the amp draw measured at step 101. In this embodiment, the circuitry 22 is configured to energise the vibration units 17 if the amp draw measured at step 101 is above a pre-defined threshold and de-energise the vibration units 17 if the amp draw measured at step 101 is below this pre-defined threshold. Accordingly, the vibration units 17 are switched off in the event that the hopper 11 becomes empty. Advantageously, this prevents unnecessary consumption of energy by the vibration units 17 and minimises wear and tear associated with operation of the vibration units 17.

In the event that the amp draw measured at step 101 is initially above the pre-defined threshold and subsequently drops below this threshold, the circuitry 22 may be configured to execute a pre-set routine to ensure that hopper 11 is fully empty of material prior to de-energising the vibration units 17.

In the event that the amp draw is above the pre-defined threshold and thus the vibration units 17 are energised, the circuitry 22 may optionally be further arranged to vary the amplitude of vibration in dependence upon the measured amp draw of the spreading disk motor 16. In particular, the circuitry 22 may be configured to increase the amplitude of vibration in response to a decrease in the amp draw of the spreading disk motor 16. It will be appreciated that such a decrease in the amp draw is likely to be attributable to a partial blockage in the discharge aperture 12. The configuration of the circuitry 22 to increase the amplitude of vibration upon measurement of such a decrease therefore facilitates clearance of the blockage. Once the blockage has been cleared, the amp draw of the spreading disk motor 16 will increase to its original value and the amplitude of vibration may be correspondingly reduced.

An alternative embodiment is illustrated in FIG. 3. In the embodiment illustrated in FIG. 3, the circuitry 22 is arranged for individually monitoring the power drawn by the spreading disk motor 16 and the auger motor 21. The circuitry 22 may comprise first and second ammeters (not shown) arranged for measuring the amp draw of the spreading disk motor 16 and the auger motor 21 respectively. The circuitry 22 is further arranged for controlling operation of the vibration units 17 in dependence upon the amp draw of the spreading disk motor 16 and/or the auger motor 21.

With particular reference to FIGS. 1, 3 and 4 of the drawings, in use, the circuitry 22 measures the amp draw of the spreading disk motor 16 and simultaneously measures the amp draw of the auger motor 21 at step 101.

If the level of material within the hopper 11 exceeds the height of the auger 18, the large load carried by the auger 18 causes a high auger motor amp draw to be measured at step 101. In addition, if the material is flowing freely out of the discharge aperture 12 of the hopper 11, there is a high flow rate of material onto the spreading disk 15 and thus the spreading disk motor 16 consumes a large amount of power in order to rotate at the desired speed. Accordingly, a high spreading disk motor amp draw is simultaneously measured by the circuitry 22 at step 101.

Conversely, if the level of material within the hopper 11 exceeds the height of the auger 18 but there is a blockage in the discharge aperture 12, the load carried by the auger 18 remains high but the flow rate of material onto the spreading disk 15 is reduced. Accordingly, a high auger motor amp draw and a low high spreading disk motor amp draw are measured at step 101.

Another possible situation is that of exhaustion of material within the hopper 11. In this situation, the load carried by the auger 18 and the flow rate of material onto the spreading disk 15 are both reduced. Accordingly, a low auger motor amp draw and a low high spreading disk motor amp draw are measured at step 101.

At step 102, the circuitry 22 controls the operation of the vibration units 17 in accordance with the amp draw measured at step 101.

If a high auger motor amp draw and a high spreading disk motor amp draw are simultaneously measured at step 101, namely if the amp draw of the auger motor 21 and the amp draw of the spreading disk motor 16 both exceed respective pre-defined thresholds, the circuitry 22 is configured to energise the vibration units 17 at step 102. It will be appreciated that this situation corresponds to the situation in which the level of material in the hopper 11 exceeds the height of the auger 18 and material is flowing freely out of the discharge aperture 12.

If a high auger motor amp draw and a low spreading disk motor amp draw are simultaneously measured at step 101, the circuitry 22 is also configured to energise the vibration units 17 at step 102. The circuitry 22 may optionally be arranged to operate the vibration units 17 at a higher intensity than the intensity of operation provided in response to measurement of a high auger motor amp draw and a high spreading disk motor amp draw. It will be appreciated that the situation of high auger motor amp draw and low spreading disk motor amp draw corresponds to the situation in which the level of material in the hopper 11 exceeds the height of the auger 18 but there is a blockage reducing or preventing the flow of material out of the discharge aperture 12 of the hopper 11.

If a low auger motor amp draw and a low spreading disk motor amp draw are simultaneously measured at step 101, the circuitry 22 is configured to de-energise the vibration units 17 at step 102, thereby avoiding agitation of an empty hopper 11.

It is envisaged that the above-described process is fully automated without the need for human intervention. Accordingly, the present invention provides a simple yet effective means of distributing granular and/or pulverulent material contained within the hopper 11 whilst avoiding unnecessary agitation and hence avoiding the above-described disadvantages of unnecessary agitation.

In an alternative embodiment (not shown), the spreading disk 15 may not be located directly underneath the lower end of the spout 13. In this embodiment, external conveying means such as a conveyer belt may be disposed between the spout 13 and the spreading disk 15, the conveyer belt being arranged for transporting material in a substantially horizontal plane from the exit of the spout 13 to the spreading disk 15. In this embodiment, the circuitry 22 may be arranged for monitoring the power drawn by the conveyer belt, either in isolation or alongside monitoring of the power drawn by the spreading disk motor 16 and/or auger motor 21. The circuitry 22 may be further arranged for controlling operation of the vibration units 17 at least partially in dependence upon the power drawn by the conveyer belt.

The invention claimed is:

1. A spreading apparatus for spreading at least one of granular or pulverulent material, the apparatus comprising:
   a hopper comprising a discharge aperture;
   agitation means for agitating material within the hopper;
   circuitry configured to supply power from a power source to one or more material handling components;
   monitoring means for monitoring the power drawn by the one or more material handling components; and
   control means for controlling operation of the agitation means in dependence upon the power.

2. The apparatus of claim 1, wherein at least one material handling component of the one or more material handling components is located at least partially within the hopper.

3. The apparatus of claim 1, wherein at least one material handling component of the one or more material handling components is located downstream of the hopper.

4. The apparatus of claim 1, wherein the control means is configured to energize or de-energize the agitation means if the power drawn by at least one material handling component of the one or more material handling components is outside of a pre-defined range.

5. The apparatus of claim 1, wherein the control means is configured to vary the intensity of agitation supplied by the agitation means in accordance with a variation in the power drawn by at least one material handling component of the one or more material handling components.

6. The apparatus of claim 1, wherein the monitoring means comprises one or more ammeters for measuring amp draw by the respective one or more material handling components.

7. The apparatus of claim 1, wherein the power source comprises a vehicle battery.

8. The apparatus of claim 1, wherein the agitation means comprises a vibration unit mounted on the hopper or proximal to the hopper on a portion of surrounding framework.

9. The apparatus of claim 1, wherein the one or more material handling components comprise spreading means configured to receive material from the discharge aperture and distribute the material.

10. The apparatus of claim 9, wherein the control means is configured to increase the intensity of agitation in response to a reduction in power drawn by the spreading means.

11. The apparatus of claim 9, wherein the control means is configured to energize or de-energize the agitation means if the power drawn by the spreading means is less than a pre-defined minimum threshold value.

12. The apparatus of claim 9, wherein the one or more handling components comprise internal conveying means for supplying material from an interior of the hopper through the discharge aperture thereof.

13. The apparatus of claim 12, wherein the control means is configured to increase the intensity of agitation in response to an increase in power drawn by the internal conveying means.

14. The apparatus of claim 12, wherein the control means is configured to energize the agitation means if the power drawn by the auger is greater than a pre-defined maximum threshold value.

15. The apparatus of claim 12, wherein the apparatus comprises spreading means and the one or more handling components comprise external conveying means for conveying material from the discharge aperture of the hopper to the spreading means.

16. The apparatus of claim 15, wherein the control means is configured to increase the intensity of agitation in response to a reduction in power drawn by the external conveying means.

17. The apparatus of claim 15, wherein the control means is configured to energize or de-energize the agitation means if the power drawn by the external conveying means is less than a pre-defined minimum threshold value.

18. A method for spreading at least one of granular or pulverulent material, the method comprising :
monitoring power consumed by one or more material handling components of a spreading apparatus; and
controlling agitation of the at least one of granular or pulverulent material contained within a hopper of the spreading apparatus in dependence upon the power.

19. The method of claim 18, wherein monitoring power consumed by one or more material handling components comprises measuring amp draw by the respective one or more material handling components.

20. The method of claim 18, wherein controlling agitation comprises controlling operation of agitation means for agitating the material contained within the hopper.

21. The method of claim 20, wherein controlling agitation comprises energising or de-energising the agitation means if the power drawn by at least one material handling component of the one or more material handling components is outside of a respective pre-defined range.

22. The method of claim 20, wherein the one or more material handling components comprise spreading means configured to receive material from a discharge aperture of the hopper and distribute the material, and wherein controlling agitation comprises at least one of:
energising the agitation means if the power consumed by the spreading means is lower than a pre-defined minimum threshold value;
de-energising the agitation means if the power consumed by the spreading means is lower than a pre-defined minimum threshold value; or
increasing the intensity of agitation in response to a reduction in power consumed by the spreading means and decreasing the intensity of agitation in response to an increase in power consumed by the spreading means.

23. The method of claim 20, wherein the one or more material handling components comprise internal conveying means for transporting material from an interior of the hopper to an exterior of the hopper through a discharge aperture thereof, and wherein controlling agitation comprises at least one of:
energising the agitation means if the power consumed by the internal conveying means is greater than a pre-defined maximum threshold value; or
increasing the intensity of agitation in response to an increase in power consumed by the internal conveying means and decreasing the intensity of agitation in response to a reduction in power consumed by the internal conveying means.

24. The method of claim 20, wherein the one or more material handling components comprise external conveying means for conveying material from a discharge aperture of the hopper to spreading means, and wherein controlling agitation comprises at least one of:
energising the agitation means if the power consumed by the external conveying means is lower than a pre-defined minimum threshold value; or
increasing the intensity of agitation in response to a reduction in power consumed by the external conveying means and decreasing the intensity of agitation in response to an increase in power consumed by the external conveying means.

* * * * *